April 20, 1943. G. W. LEE Re. 22,304

PLOW

Original Filed Aug. 28, 1939 2 Sheets-Sheet 1

Inventor

GEORGE W. LEE

By Semmes, Keegin, Beale & Semmes

Attorneys

April 20, 1943. G. W. LEE Re. 22,304

PLOW

Original Filed Aug. 28, 1939 2 Sheets-Sheet 2

Inventor

GEORGE W. LEE

By Semmes, Keegin, Beale & Semmes

Attorneys

Reissued Apr. 20, 1943

Re. 22,304

UNITED STATES PATENT OFFICE 22,304

PLOW

George W. Lee, Willow Springs, N. C.

Original No. 2,226,665, dated December 31, 1940, Serial No. 292,356, August 28, 1939. Application for reissue August 19, 1941, Serial No. 407,508

7 Claims. (Cl. 97—118)

My invention relates to improvements in plows and more particularly to plows of the sweep type.

One of the principal objects of my invention is to provide a plow of the above described character embodying a construction and arrangement which is such that the sweep may be conveniently adjusted with respect to the share and to operate at any desired angle or inclination with respect to the body.

Another object of my invention is to provide a plow of the above described character embodying novel means for adjustably and releasably securing the sweep to the body of the plow.

A further object of my invention is to provide a plow of the above described character which is simple in construction, durable in use, efficient in operation and economical in manufacture.

Other objects and advantages will be apparent from the following description, appended claims and annexed drawings.

Referring to the drawings wherein like reference characters designate like parts throughout the several views.

Figure 1:
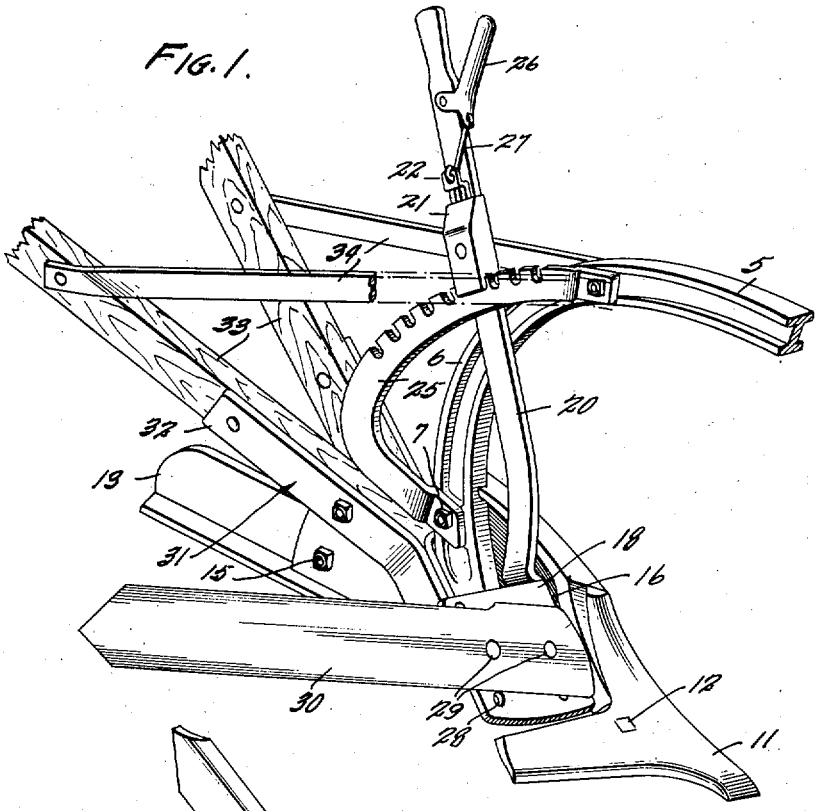
Figure 1 is a perspective view of my invention.
Figure 2:
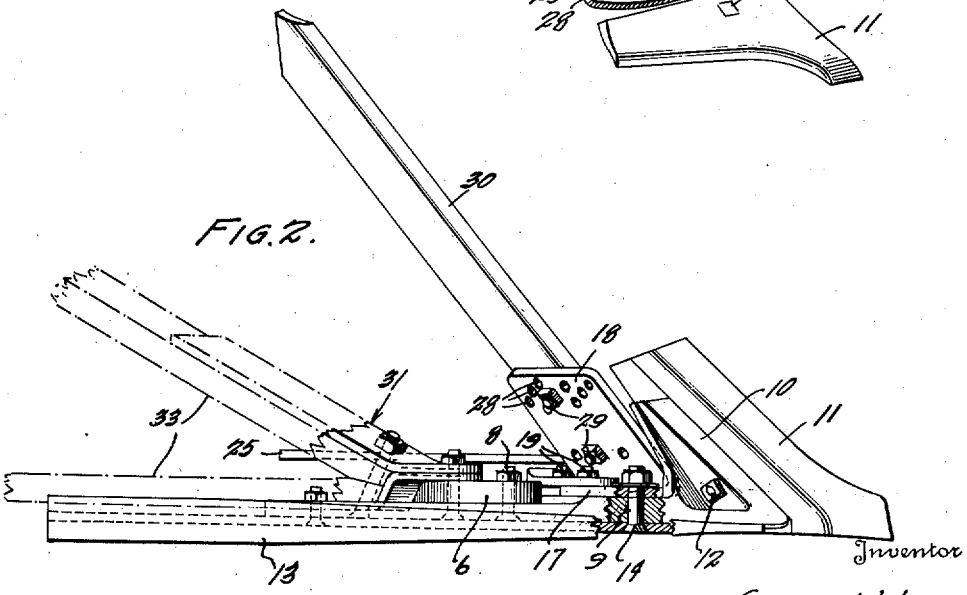
Figure 2 is a bottom plan view thereof partly in section.
Figure 3:
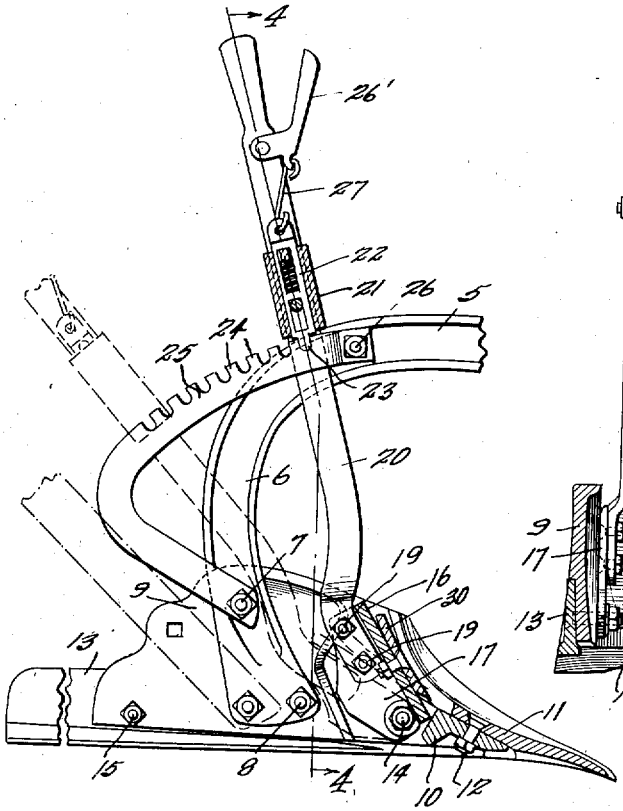
Figure 3 is a vertical longitudinal sectional view of the plow.
Figure 4:
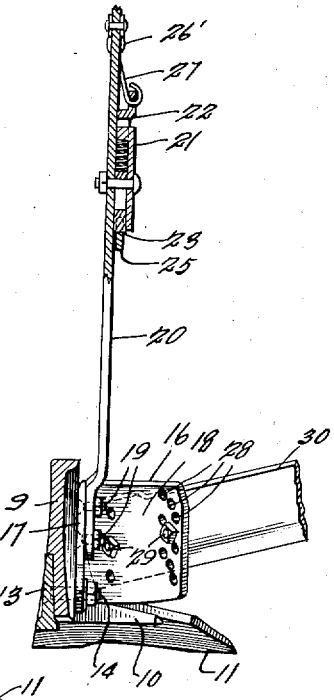
Figure 4 is a detail sectional view taken on the line 4—4 of Figure 3.

Referring now to the drawings in detail it will be seen that the embodiment of the invention which has been illustrated in Figures 1 to 4 inclusive comprises a beam 5 fashioned on the rear end with an arcuate-shaped stock 6, the lower end of which is connected by means of upper and lower bolts 7 and 8 respectively to the inner face of the body 9. The forward end of the body is formed with a frog 10 to which is immovably fixed thereto a share 11 by means of a bolt and nut 12, said bolt being fashioned with a squared head seated within a like shaped socket fashioned in the outer face of the share.

The outer face of the body 9 adjacent the lower edge thereof has secured thereto a landside 13 by means of front and rear bolts 14 and 15 respectively. The bolt 14 extends transversely through the body 9 adjacent the rear end of the frog 10 and has pivoted thereon a lower corner of an adjusting plate 16, the latter being fashioned with inner and outer angularly disposed sections 17 and 18 respectively. The inner section 17 is disposed in substantial parallelism with the inner face of the body and has fixed thereto by means of bolts and nuts 19 the lower end of a lever 20, the upper end of the latter having secured thereon a housing 21 in which is slidably mounted a spring pressed rack pawl 22 having formed on its lower end a tooth 23 for engagement between a pair of teeth forming part of a series of spaced teeth 24 fashioned on an arcuate-shaped rack bar 25. One end of the rack bar is connected by means of a bolt 26 to the beam 5 superjacent the stock 6 and the opposite end of said bar 25 is connected to the stock 6 in proximity to the body 9 by means of the upper bolt 7.

The upper end of the lever 20 has pivoted thereto a finger-piece 26′, the latter being connected to the upper end of the pawl 22 by means of a link 27 whereby operation of the finger-piece 26′ towards the upper end of the lever serves to disconnect the pawl 22 with the rack bar 25 and permit adjustment of the lever with respect to the body 9. Obviously, adjustment of the lever 20 serves to effect a similar adjustment of the plate 16.

The outer section 18 of the plate 16 is provided with a series of spaced apertures 28 through a pair of which extend bolts 29 and which connect to said plate 16 a sweep 30, it being understood that the sweep 30 is employed in lieu of the ordinary fixed mold-board in a plow of ordinary construction. By extending the bolts 29 through various pairs of the openings 28 adjustment of the sweep 30 may be had with respect to the plate 16.

The rear end of the body 9 has attached thereto the lower end of a fork 31, the upper end of which is fashioned with a pair of upwardly and outwardly diverging arms 32 to which are connected the lower ends of the plow handles 33. Rear ends of braces 34 are connected to the plow handles 33 above the arms 32 and have their forward ends connected to the beam 5 through the medium of the bolt 26 whereby to reenforce the structure.

From the foregoing it will be apparent that the sweep 30 may be adjusted relative to the body and to the share 11 through the medium of the lever 20 thereby permitting a desired amount of soil to be rowed about plants, for instance tobacco during cultivation thereof. Furthermore, when the plow is being operated over inclined ground, the sweep 30 may be readily adjusted at the end of each row to effect displacement of substantially the same amount of soil from a furrow when the plow is operated in a reverse direction.

Figure 5:
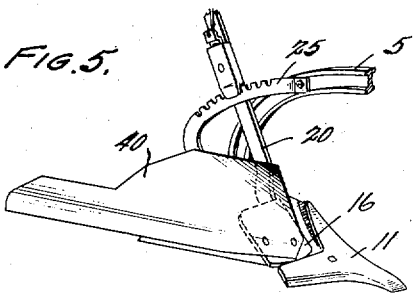
Figure 5 is a perspective view of my novel form of plow but illustrating the same as having a modified form of sweep attached thereto.
Figure 6:
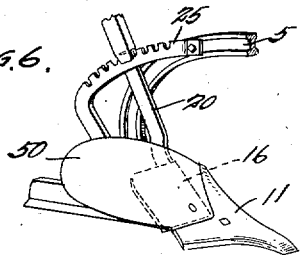
Figure 6 is a perspective view of the plow illustrating the same provided with a mold-board.

As illustrated in Figure 5 of the drawings a combined mold-board and sweep 40 may be attached to the plate 16 for adjustment relative to the share 11. In instances where a sweep is not adapted for use, a mold-board 50 may be attached to the plate 16 and in fixed relation to the share 11 as clearly illustrated in Figure 6 of the drawings, it being understood that the lever 20 is moved to a position with respect to the bar 25 to preclude operation of the mold-board 50 and that the front end of the latter snugly fits within the rear end of the shaft to preclude relative movement therewith.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

I claim:

1. In a plow structure, comprising a body, a share immovably fixed to said body, a land-side carried by the body, a sweep adjustably secured to a plate of angular form, and means for pivotally connecting and adjusting said plate on the body.

2. In a plow structure, comprising a body, a share immovably fixed to said body, a land-side carried by the body, a plate pivotally carried by the body and having an angular portion extending rearwardly with a series of openings, a rearwardly extending sweep secured by bolts within the angular portion for vertical adjustment, and a lever adapted to move said pivoted plate for raising and lowering the free end of the sweep.

3. In a plow structure, comprising a body, a share immovably fixed to said body, a land-side carried by the body, a vertically disposed plate pivotally secured at its lower end to the body and having an angular portion extending rearwardly on the opposite side from the land-side, said plate having a series of transverse openings, a rearwardly extending sweep secured by bolts through said openings for vertical adjustment of the sweep thereon, a lever rigidly connected to the plate above the pivotal connection thereof with the body, and means for holding said lever in its adjusted position.

4. A plow construction comprising a body portion, a share fixed thereto, a support pivotally attached to the body portion adjacent the share, said support having a plane surface and a turning axis intersecting the plane surface at an acute angle thereto, a sweep secured to the plane surface of the support, means to permit change of the relative angular position of the sweep with respect to the support, and additional means to change the position of the support with respect to the body portion.

5. A plow construction comprising a body portion, a share fixed thereto, a support pivotally attached to the body portion adjacent the share, said support having a plane surface and a turning axis intersecting the plane surface at an acute angle thereto, a sweep secured to the plane surface of the support, means to permit change of the relative angular position of the sweep with respect to the support, and a lever rigidly attached to the support whereby the position of the support with respect to the body portion may be changed.

6. A plow construction comprising a body portion, a share fixed thereto, a support pivotally attached to the body portion adjacent the share, said support having a plane surface and a turning axis intersecting the plane surface at an acute angle thereto, a sweep secured to the plane surface of the support, means to permit change of the relative angular position of the sweep with respect to the support, a lever rigidly attached to the support whereby the position of the support with respect to the body portion may be changed, and releasable detent means associated with the lever for inhibiting change of position of the support with respect to the body portion.

7. A plow construction comprising a body portion, a share fixed thereto, a support pivotally attached to the body portion adjacent the share, said support having a plane surface and a turning axis which intersects the lower edge of the plane surface at an angle thereto, a sweep attached adjacent one of its ends to the plane surface of the support and forming thereby a continuation of the share, means to permit change of the relative angular position of the sweep with respect to the support and additional means to move the support about its turning axis to change the relative angular position of the sweep with respect to the body portion.

GEORGE W. LEE.